(12) United States Patent
Mittricker et al.

(10) Patent No.: US 11,561,047 B2
(45) Date of Patent: Jan. 24, 2023

(54) SYSTEM AND METHOD FOR THERMAL CONVERSION OF MATERIALS USING MULTIPLE LOOPS COMPRISING A PRIMARY HEAT TRANSFER LOOP, AN INTERMEDIATE HEAT TRANSFER LOOP AND A THERMAL CONVERSION CIRCUIT

(71) Applicant: XYZ Energy Group, LLC, Spring, TX (US)

(72) Inventors: Frank F. Mittricker, Jamul, CA (US); Loren K. Starcher, Longboat Key, FL (US); Richard Alan Huntington, Spring, TX (US)

(73) Assignee: XYZ ENERGY GROUP, LLC, Spring, TX (US)

( * ) Notice: Subject to any disclaimer, the term of this patent is extended or adjusted under 35 U.S.C. 154(b) by 0 days.

(21) Appl. No.: 17/480,299

(22) Filed: Sep. 21, 2021

(65) Prior Publication Data
US 2022/0099376 A1 Mar. 31, 2022

Related U.S. Application Data

(60) Provisional application No. 63/084,160, filed on Sep. 28, 2020.

(51) Int. Cl.
*F28D 7/00* (2006.01)
*C01B 3/38* (2006.01)

(52) U.S. Cl.
CPC ............ *F28D 7/0008* (2013.01); *C01B 3/388* (2013.01); *C01B 2203/0833* (2013.01)

(58) Field of Classification Search
CPC ............ C01B 3/388; C01B 2203/0833; C01B 2203/0233; C01B 2203/0283;
(Continued)

(56) References Cited

U.S. PATENT DOCUMENTS

| 3,029,197 A | 4/1962 | Untermyer |
| 3,742,708 A | 7/1973 | Vidal et al. |

(Continued)

OTHER PUBLICATIONS

"Fluoride-Salt-Cooled High Temperature Reactor (FHR) Materials, Fuels and Components White Paper"; FHR Materials, Fuels and Components White Paper; Integrated Research Project Workshop 3; Department of Nuclear Engineering and Engineering Physics, University of Wisconsin, Madison; Jul. 2013.

(Continued)

*Primary Examiner* — Jafar F Parsa
(74) *Attorney, Agent, or Firm* — Edmonds & Cmaidalka, P.C.

(57) ABSTRACT

Methods and systems for producing a thermally converted product stream (and optionally heat and power) from a high value heat source using a plurality of circulating loops comprising a primary heat transfer loop, several substantially not recirculated process heater, reactor or separator systems and an intermediate heat transfer loop that transfers heat from the high-temperature heat transfer loop to the several process heater, reactor or separator systems. The intermediate heat transfer loop is arranged to eliminate to the extent practical the shell and tube heat exchangers especially those heat exchangers that have a very large pressure difference between the tube side and shell side, to eliminate shell and tube, plate type, double pipe and similar heat exchangers that transfer heat directly from the primary heat transfer loop to the several process heater, reactor or separator systems with very high differential pressures and to maximize the use of heat transfer coils similar in design as are used in a heat recovery steam generator commonly used to transfer heat from gas turbine flue gas to steam or other power cycle fluids as part of a combined cycle power plant.

13 Claims, 5 Drawing Sheets

(58) Field of Classification Search
CPC ....... C01B 2203/0405; C01B 2203/043; F28D 7/0008; Y02P 20/10; Y02P 20/29
See application file for complete search history.

(56) References Cited

U.S. PATENT DOCUMENTS

| | | | |
|---|---|---|---|
| 3,756,023 | A | 9/1973 | Berman |
| 4,362,149 | A | 12/1982 | Thomson |
| 4,668,494 | A | 5/1987 | Van Hook |
| 4,768,345 | A | 9/1988 | Kardas |
| 5,242,563 | A | 9/1993 | Stern et al. |
| 5,862,800 | A | 1/1999 | Marko |
| 6,041,588 | A | 3/2000 | Bruckner |
| 6,701,711 | B1 | 3/2004 | Litwin |
| 6,957,536 | B2 | 10/2005 | Litwin et al. |
| 7,051,529 | B2 | 5/2006 | Murphy et al. |
| 8,365,529 | B2 | 2/2013 | Litwin et al. |
| 8,594,268 | B2 | 11/2013 | Shu |
| 9,368,244 | B2 | 6/2016 | Woolley |
| 9,624,912 | B2 | 4/2017 | Shim et al. |
| 2004/0250998 | A1 | 12/2004 | Charron |
| 2004/0251006 | A1 | 12/2004 | Marin |
| 2005/0126170 | A1 | 6/2005 | Litwin |
| 2009/0090111 | A1 | 4/2009 | Tomlinson |
| 2009/0139556 | A1 | 6/2009 | Bell et al. |
| 2012/0285167 | A1 | 11/2012 | Horek |
| 2013/0139509 | A1 | 6/2013 | Berti |
| 2013/0180520 | A1 | 7/2013 | Raade et al. |
| 2014/0033676 | A1 | 2/2014 | Pang et al. |
| 2014/0075939 | A1 | 3/2014 | Aga et al. |
| 2014/0245737 | A1 | 9/2014 | Ikegami et al. |
| 2018/0003085 | A1 | 1/2018 | Uechi et al. |

OTHER PUBLICATIONS

"Alloys for Molten-Salt Reactors"; V.M. Azhazha et al.; National Science Center "Kharkov Institute of Physics and Technology"; Kharkov, Ukraine; pp. 40-47; 2005.

Generation IV International Forum, Proceedings, GIF Symposium; Paris, France; Sep. 9-10, 2009.

"Corrosion behavior of Hastelloy-N alloys in molten salt fluoride in Ar gas or in air"; Ken-ichi Fukumoto et al.; Journal of Nuclear Science and Technology, 52:10; pp. 1323-1327; 2015.

"Corrosion testing of nickel alloy for molten salt reactors"; P. Slama et al.; Journal of Achievements in Materials and Manufacturing Engineering, vol. 70, Issue 2; pp. 78-85; Jun. 2015.

"Corrosion Aspects of Compatible Alloys in Molten Salt (Flinak) Medium for Indian MSR Program in the Temperature Range of 550-750 °C Using Electrochemical Techniques"; S.J. Keny et al.; Thorium Energy Conference 2015; Mumbai, India; Oct. 12-15, 2015.

"Materials and Metals in MSR"; Presented by Victor Ignatiev; National Research Center "Kurchatov Institute"; Lecco, Italy; MSR Summer school, Jul. 2-4, 2017.

"Construction Materials for Molten-Salt Reactors"; W. D. Manly et al.; Fluid Fuel Reactors, Chapter 13, pp. 595-625; 1958.

"Material Corrosion in Molten Salt Reactors"; Joe Sundae; Submitted as coursework for PH241, Stanford University, Winter 2017; Feb. 21, 2017.

"Molten salt reactor research develops class of alloys"; World Nuclear News; http://www.world-nuclear-news.org/NN-Molten-salt-reactor-research-develops-class-of-alloys-08021701.html; Feb. 8, 2017.

"Molten Salt Reactors"; Yousif Kelaita; Submitted as coursework for PH241, Stanford University, Winter 2015; Feb. 18, 2015.

"Molten Salts for High Temperature Reactors: University of Wisconsin Molten Salt Corrosion and Flow Loop Experiments—Issues Identified and Path Forward"; Piyush Sabharwall et al.; Idaho National Laboratory; Mar. 2010.

"Compatibility Studies of Potential Molten-Salt Breeder Reactor Materials in Molten Fluoride Salts"; J.R. Keiser; Oak Ridge National Laboratory; ORNL/TM-5783; May 1977.

"Technical Description of the "Mark 1" Pebble-Bed Fluoride-Salt-Cooled High-Temperature Reactor (PB-FHR) Power Plant"; Charalampos "Harry" Andreades et al.; Mark-1 PB-FHR Technical Description; Department of Nuclear Engineering, University of California, Berkeley; Sep. 30, 2014.

"Molten salts database for energy applications"; R. Serrano-Lopez et al.; Preprint submitted to Chemical Engineering & Processing: Process Intensification; Sep. 17, 2013.

"Components and Systems Development for Molten-Salt Breeder Reactors"; Dunlap Scott et al.; Oak Ridge National Laboratory; ORNL-TM-1855; Jun. 30, 1967.

"Industrial Use of Molten Nitrate/Nitrite Salts"; R. W. Carling et al.; Sandia National Laboratories Energy Report Albuquerque, New Mexico; Dec. 1981.

"Assessment of Candidate Molten Salt Coolants for the Advanced High-Temperature Reactor (AHTR)"; D. F. Williams et al.; Oak Ridge National Laboratory; ORNL-TM-2006/12; Mar. 2006.

"Molten Salt Storage"; John Dorado; Submitted as coursework for PH240, Stanford University, Fall 2015; Dec. 15, 2015.

"Engineering Database of Liquid Salt Thermophysical and Thermochemical Properties"; Manohar S. Sohal et al.; Idaho National Laboratory; Mar. 2010.

"Corrosion in Very High-Temperature Molten Salt for Next Generation CSP Systems"; Brenda Garcia Diaz et al. Savannah River National Laboratory; Apr. 1, 2013.

"Molten Salt Coolants for High Temperature Reactors: A Literature Summary of Key R&D Activities and Challenges" David Samuel; IAEA Internship Report; INPRO COOL; May 2009.

"Molten-Salt Reactor Experiment"; Wikipedia; https://en.wikipedia.org/wiki/Molten-Salt_Reactor_Experiment; May 18, 2017.

"HITEC Heat Transfer Salt"; Coastal Chemical Co., L.L.C.; Brenntag Company; Houston, TX.

"Experience with the Molten-Salt Reactor Experiment"; Paul Haubenreich et al.; Nuclear Applications & Technology, vol. 8; pp. 118-136; Feb. 1970.

ORNL Summary of the properties of candidate coolants.

"Design and Operation of Forced-Circulation Corrosion Testing Loops with Molten Salt"; J. L. Crowley et al.; Oak Ridge National Laboratory; ORNL-TM-528; May 1963.

"Design Study of a Heat-Exchange System for One MSBR Concept"; C. E. Bettis et al.; Oak Ridge National Laboratory; ORNL-TM-1545; Sep. 1967.

"Assessment of Candidate Molten Salt Coolants for the NGNP/NHI Heat Transfer Loop"; D. F. Williams.; Oak Ridge National Laboratory; ORNL-TM-2006/69; Jun. 2006.

"Estimated Cost of Adding a Third Salt-Circulating System for Controlling Tritium Migration in the 1000-MW(e) MSBR" Roy C. Robertson; Oak Ridge National Laboratory; ORNL-TM-3428; Jul. 1971.

"Heat Transfer Salt for High Temperature Steam Generation"; E. G. Bohlmann; Oak Ridge National Laboratory; ORNL-TM-3777; Dec. 1972.

"Corrosion and Mass Transfer Characteristics of NaBF4-NaF (92-8 mole %) in Hastelloy N"; J. W. Koger; Oak Ridge National Laboratory; ORNL-TM-3866; Oct. 1972.

"Status of Tellurium-Hastelloy N Studies in Molten Fluoride Salts"; J. R. Keiser; Oak Ridge National Laboratory; ORNL-TM-6002; Oct. 1977.

"Conceptual Design Characteristics of a Denatured Molten-Salt Reactor with Once-Through Fueling"; J. R. Engel et al. Oak Ridge National Laboratory; ORNL-TM-7207; Jul. 1980.

"An Account of Oak Ridge National Laboratory's Thirteen Nuclear Reactors"; Murray W. Rosenthal; Oak Ridge National Laboratory; ORNL-TM-2009/181; Published Aug. 2009, Revised Mar. 2010.

"Revised Phase Diagram of the System NaF—NaBF4"; Jarmila Mlynarikova et al.; Monatshefte fuer Chemie/Chemical Monthly, 139, pp. 77-80 (2008); Springer-Verlag 2007; Published online Dec. 10, 2007.

"Surface tensions of some binary fused salt systems"; June Lomnes Dahl; Dissertation, Physical Chemistry; Iowa State College; 1957.

"High-Efficiency Thermodynamic Power Cycles for Concentrated Solar Power Systems"; Marc T. Dunham et al.; BYU ScholarsArchive; All Faculty Publications; Paper 1585; 2014.

(56) References Cited

OTHER PUBLICATIONS

"Supercritical Carbon Dioxide Brayton Cycle"; Quadrennial Technology Review 2015; Chapter 4: Advancing Clean Electric Power Technologies; U.S. Department of Energy.
"Review of Supercritical CO2 Power Cycle Technology and Current Status of Research and Development"; Yoonhan Ahn et al.; Nuclear Engineering and Technology 47, pp. 647-661; 2015.
"Critical thinking: Ultra and supercritical technology focus"; Paul Breeze; Power Engineering International; Mar. 23, 2017.
"Welcome to Presentation on Supercritical Boiler"; C. P. Sahoo; Adani Power Maharashtra LTD.
"Gas-Cooled Reactor Coolant Circulator and Blower Technology"; Proceedings of a Specialists Meeting Organized by the International Atomic Energy Agency; International Working Group on Gas-Cooled Reactors; IWGGCR/17; San Diego; Nov. 30-Dec. 2, 1987.
"Description of the Advanced Gas Cooled Type of Reactor (AGR)"; Erik Nonbol; Riso National Laboratory; Roskilde, Denmark; Nov. 1996.
"How an AGR power station works"; British Energy Group plc; 2006.
"High Temperature Issues in Advanced Gas Cooled Reactors (AGR)"; M. P. O'Donnell et al.; TAGSI/FESI Symposium 2013: Structural Integrity of Nuclear Power Plant.
International Search Report for PCT/US2019/024982 dated Jul. 22, 2019 from the International Search Authority of the PCT.

System 100

Sub System 1 – Primary Heat Transfer System

System 200

SYSTEM AND METHOD FOR THERMAL CONVERSION OF MATERIALS USING MULTIPLE LOOPS COMPRISING A PRIMARY HEAT TRANSFER LOOP, AN INTERMEDIATE HEAT TRANSFER LOOP AND A THERMAL CONVERSION CIRCUIT

BACKGROUND OF THE INVENTION

Many countries around the world have made commitments to significantly reduce or eliminate Green House Gas (GHG) emission by 2050. With renewable power, such as photovoltaic solar (PV), solar concentrated power (SCP) and wind power, price reductions, a large reduction in the largest $CO_2$ emission sector (power generation) will be possible but the second largest $CO_2$ emission sector (industrial processes) has not had the technical breakthroughs to make significant $CO_2$ emission reduction in this sector economically feasible. The costs for $CO_2$ capture from these processes and/or refueling with hydrogen or other non-GHG fuels have not become economically viable.

Industrial furnaces are used to supply high temperature process heat. The adiabatic flame temperature for methane combusted in air is 1963° C. (3565° F.). Unfortunately, these furnaces produce 66 kg of $CO_2$ (at 80% HHV combustion efficiency) for every MBTU/hr of heat absorbed. Therefore, since industrial furnaces are the second largest worldwide $CO_2$ emissions producers, only one percentage point below the worldwide leading $CO_2$ emissions sector (power generation), large reductions in GHG emissions will only occur if the emissions from industrial furnaces can be significantly reduced.

This invention describes a new novel process configuration that that utilizes renewable heat (molten salt or metals from a concentrated solar plant or nuclear reactor, for example) to provide the heat for to thermal process reactions. Much recent research has focused on new catalysts that can perform at lower temperatures to increase the thermal efficiency of these very endothermic reactions, however, many of these new catalyst only convert a portion of the feed into the desired end product. There has also been research and bench scale testing of membrane reactors that shift the equilibrium point and allow higher conversion rates at lower operating temperatures.

The present invention can be utilized with the currently available commercial catalyst and would also work with the new lower temperature catalyst as they are developed or even with the membrane reactors as they are commercialized.

This new process configuration can achieve total conversion rates equal to or even higher than that in the current state of the art processes. This is achieved by having multiple (more than one) conversion and separation steps in series. To better understand this new process configuration and as an example, consider the following description of its application for steam methane reforming (SMR). The production of hydrogen and the production of ammonia (which uses hydrogen as a feedstock) are some of the largest $CO_2$ emission producers in the industrial sector.

For hydrogen production, this new process configuration could utilize molten salt from a concentrated solar receiver to heat (for example) the methane feed and generate steam for example and pass them over a currently available Ni based catalyst to generate a stream comprised of hydrogen, $CO_2$, CO, unreacted methane that may be processed again in a further reaction stage. At the temperatures currently available with solar salts (up to 600° C.) the methane conversion rate would be about 50%. The effluent would be then cooled to 440° C. (to obtain 95% conversion of the CO to $CO_2$ in the Water Gas Shift (WGS) reaction). The current state of the art uses a WGS reactor and $CO_2$ adsorption in separate devices. These may be combined into a combined WGS and $CO_2$ adsorption device with recent technology developments[i].

When the absorbent is fully loaded, the vessel is taken out of service and regenerated either by pressure swing or a temperature swing to release a high purity $CO_2$ stream for sequestration or for enhanced oil recovery. The heated feed is diverted to a regenerated vessel and this cyclical shift and $CO_2$ capture process is able to run on a continuous basis. The effluent from the combined WGS and $CO_2$ absorbent vessel is then sent to a hydrogen separation membrane and the high purity hydrogen product is removed. The effluent from the hydrogen separation membrane, which is mostly unconverted methane and steam (with small quantities of CO and the inert gases in the natural gas), is then reheated with solar salt and sent to the second methane conversion train. The total number of conversion trains in series is determined by an economic evaluation of the cost of the next conversion train compared to decreased cost by reducing the size of the recycle stream. In the final conversion train, the stream going to the WGS is cooled to about 220° C. to convert 99% of the CO to $CO_2$. The unconverted methane and steam stream is recycled and combined with the fresh feedstock, in this example, that would be the methane and steam feed stream.

In 20190301309A1, Huntington et al disclosed systems and methods to transfer and convert heat energy to useful power at high efficiency wherein the high value heat is transferred to a recirculated power cycle using a plurality of heat transfer fluids, loops and heat exchange devices or systems. This disclosure provided the capability to increase the power cycle efficiency for concentrated solar power plants and other sources of high value heat by eliminating the restrictions imposed by direct heat transfer via shell and tube and similar heat transfer devices. Elimination of these restrictions facilitated increasing the operating pressures of the recirculated power cycle fluid (e.g. steam) to a supercritical and even ultra-supercritical pressures and temperatures with multiple reheats with a Rankine or alternative power cycle.

This heat transfer technology utilizes an intermediate heat transfer fluid (IHTF) to ensure there is no cross contamination of the salt and the high pressure power working fluid. This has been a major service factor problem in concentrated solar power plants. It also allowed the IHTF to be reheated several times. This patent would utilize similar heat transfer technology but would use it to heat and reheat the process feed for each conversion train.

The major difference is that in the power plant design, generally all the power cycle working fluid is recirculated and reheated for each step. While with this new invention, it is surprising and unexpected that efficient thermal conversion systems and methods can be created by replacing the recirculated power cycle fluid by a substantially not recirculated process feed stream, intermediate product streams, byproduct streams and unreacted feed stream with multiple heating, cooling, thermal conversion and/or separation steps that use the IHTF to simultaneously supply heat from high value heat sources and move energy among the several steps of the thermal conversion system. For the most part, the initial feed passes through the thermal conversion only one time to form the desired products and byproducts. However, in some process designs, a portion of unreacted feed or other byproducts may be returned to feed for further processing to improve conversion efficiency or for other process needs.

Another major difference is that when the process stream needs to be cooled that heat can be used to do some of the initial process stream heating (via heat integration with the IHTF). This makes the process more thermally efficient and reduces the amount of high-level solar heat required. If the process contains any exothermic reactions, that heat can also be used to heat the IHTF. In the example of Steam Methane Reforming (SMR), both the heat from cooling the process stream going to the WGS and the exothermic reaction heat from the WGS is used to reheat the IHTF. In the current state of the art SMR process that heat is used to produce steam. The current state of the art SMR produces more steam than it requires, and that steam must be exported or condensed reducing the thermal efficiency of the process. By integrating the exothermic heat to increase the temperature of the IHTF, the unexpected and surprising result is that excess steam production may be reduced or even eliminated.

SUMMARY OF THE INVENTION

Methods and systems for providing process heat for thermally converting hydrocarbon fluids; chemicals and other substances using an intermediate heat transfer loop (IHTL) are provided. In one embodiment, the method includes: providing four or more discreet heat transfer devices, arranged in series, and confined within a contained housing; circulating an intermediate heat transfer fluid (IHTF) through the housing and about the four or more discreet heat transfer devices; heating a primary heat transfer fluid (PHTF) using an external heat source to provide a heated primary heat transfer fluid; circulating a first portion of the heated primary heat transfer fluid through a first of the four or more discreet heat transfer devices within the housing and circulating a second portion of the heated primary heat transfer fluid through a second of the four or more discreet heat transfer devices within the housing, whereby the intermediate heat transfer fluid is indirectly heated by the heated primary heat transfer fluid from both the first and second discreet heat transfer devices; circulating at least a portion of a hydrocarbon fluid, chemical or other substance (feed) through a third of the four or more discreet heat transfer devices within the housing and causing a thermal conversion of at least a part of the feed to produce a product, byproduct and possibly a portion of unreacted feed; circulating a fluid comprising one or more of a second portion of a feed, a part of the product, a part of the byproduct, or a part of the unreacted feed through a fourth of the four or more discreet heat transfer devices within the housing and causing at least one of an additional thermal conversion, separation of the said fluid to form a product or byproduct rich stream and a product or byproduct lean stream and heating or cooling of the fluid.

BRIEF DESCRIPTION OF THE DRAWINGS

So that the manner in which the above recited features of the present invention can be understood in detail, a more particular description of the invention, briefly summarized above, can be had by reference to embodiments, some of which are illustrated in the appended drawings. It is to be noted, however, that the appended drawings illustrate only typical embodiments of this invention and are therefore not to be considered limiting of its scope, for the invention can admit to other equally effective embodiments.

DETAILED DESCRIPTION

Figure 1:
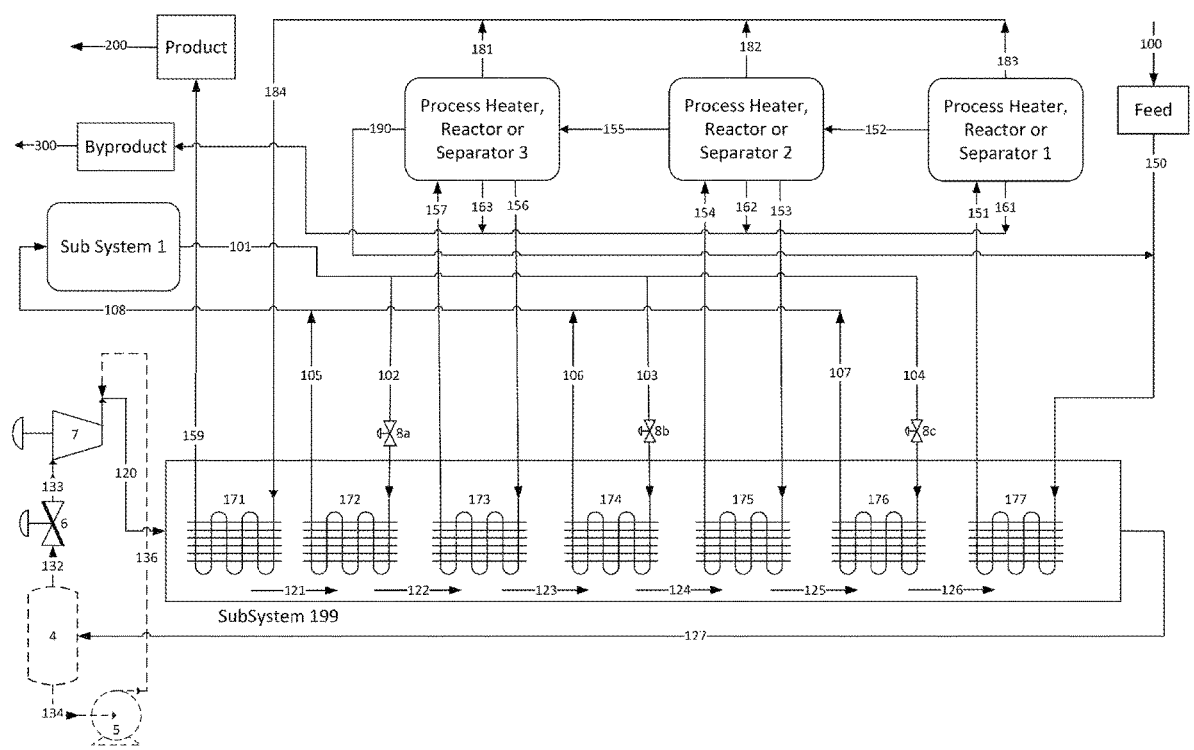
FIG. 1 depicts a schematic representation of an illustrative System 100 for thermally converting hydrocarbon fluids, chemicals and other substances, according to one or more embodiments provided herein. System 100 further depicts a system in which the IHTF is substantially recirculated by use of a blower or similar device.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows can include embodiments in which the first and second features are formed in direct contact and can also include embodiments in which additional features can be formed interposing the first and second features, such that the first and second features cannot be in direct contact. The exemplary embodiments presented below also can be combined in any combination of ways, i.e., any element from one exemplary embodiment can be used in any other exemplary embodiment, without departing from the scope of the disclosure. The figures are not necessarily to scale and certain features and certain views of the figures can be shown exaggerated in scale or in schematic for clarity and/or conciseness Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure can be exact or approximate values ("about") unless otherwise specifically stated. Accordingly, various embodiments of the disclosure can deviate from the numbers, values, and ranges disclosed herein without departing from the intended scope.

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise.

The terms "up" and "down"; "upward" and "downward"; "upper" and "lower"; "upwardly" and "downwardly"; "above" and "below"; and other like terms as used herein refer to relative positions to one another and are not intended to denote a particular spatial orientation since the apparatus and methods of using the same can be equally effective at various angles or orientations.

A detailed description will now be provided. Each of the appended claims defines a separate invention, which for infringement purposes is recognized as including equivalents to the various elements or limitations specified in the claims. Depending on the context, all references to the "invention" can in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

FIG. 1 depicts a schematic representation of an illustrative System 100 for thermally converting a feed to produce at least a thermally converted product stream, according to one or more embodiments provided herein. System 100 can include at least one high-value heat source depicted as Sub System 1, a system to circulate a PHTF from Sub System 1 to a process plant, one or more heat exchange devices (three are shown 172, 174, and 176) to transfer heat from the PHTF via streams 101, 102, 103 and 104 to a circulating IHTF and return the PHTF to Sub System 1 via streams 105, 106, 107 and 108, one or more heat exchange devices (four are shown 171, 173, 175, and 177) to transfer heat to or from the circulating IHTF to the substantially not recirculated feed at several points within the thermal conversion process plant, to generate useful products and byproducts and possibly to recycle a portion of any unreacted feed to another stage of the thermal conversion process plant. System 100 depicts a closed intermediate heat transfer loop wherein the intermediate heat transfer loop is substantially recirculated. System 100 can further include a pump, fan or blower or other compression device (7) to cause and/or control the circulation of the IHTF and can also include a valve or damper (6), separator (4) and pump (5).

Figure 2:
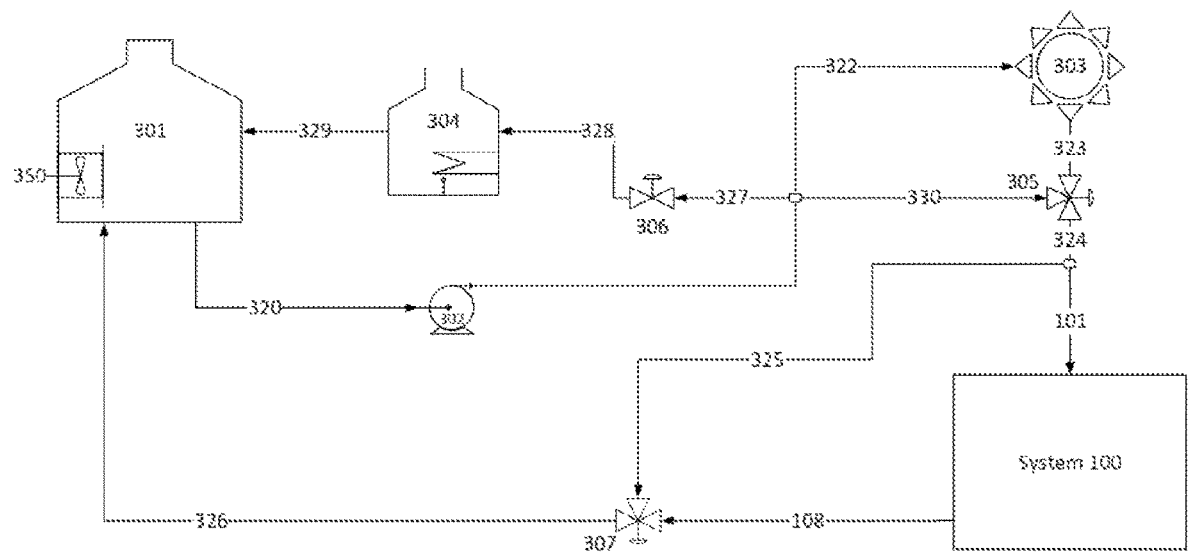
FIG. 2 depicts a schematic representation of the primary heat transfer loop having optional storage, at least one circulating pump and a high-value heat source, according to one or more embodiments provided herein.
Figure 5:
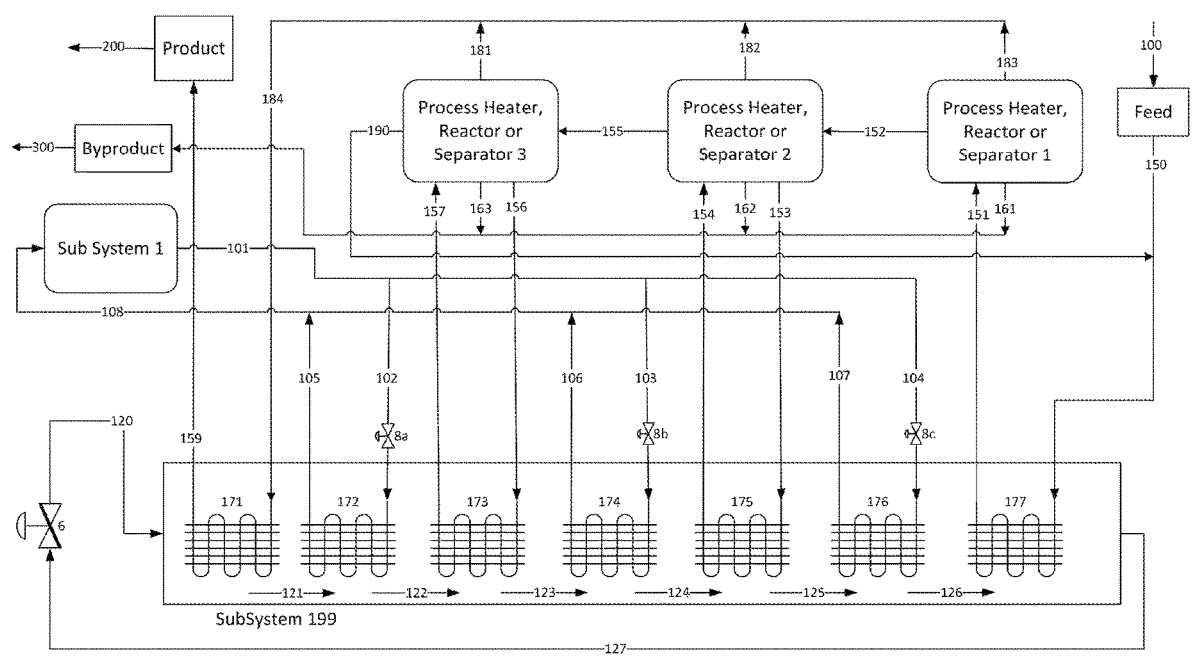
FIG. 5 depicts System 200 in which the circulation of the IHTF is primarily by natural convection.

FIG. 2 depicts an illustrative Primary Heat Transfer Loop (PHTL) used with the primary heat transfer system (Sub System 1). The Sub System 1 can include at least one circulating pump 302 and the high-value heat source 303. Referring to FIGS. 1, 2 and 5, the Primary Heat Transfer Loop (PHTL) can include a recirculating PHTF such as a molten salt, oil, liquid metal (e.g. molten sodium) or other medium that remains in the liquid phase for all operating conditions of the process. The PHTL can also include one or more tanks (301), one or more circulating pumps (302) and at least three heat exchange devices to 1) raise the temperature of the PHTF by absorbing heat from the High-Value Heat Source (HVHS) (303) and 2) lower the temperature of the PHTF by releasing heat to the Intermediate Heat Transfer Loop (IHTL) through at least two heat exchange devices (e.g. at least two of Coils 171-177). The HVHS can include one or more solar heat collectors or receivers, concentrated solar heat collectors or receivers, nuclear reactors, geothermal heat collectors, heat sources associated with combustion of hydrogen or other non-GHG emitting fuel(s), hydrocarbon or biomass fuels or other heat sources known to those skilled in the art.

The PHTF can be circulated through the PHTL to the high value heat source at a temperature as low as the freezing point of the PHTF (e.g. 100° C. for liquid sodium) and gain energy from the heat source as evidenced by an increase in the temperature of the PHTF of 50° C., 100° C., 150° C., 200° C., 300° C., 400° C., 500° C. or more to leave the HVHS at a temperature as high as 1000° C. or more. This high temperature is generally limited by the boiling point of the PHTF and/or capabilities of the containment and piping system (e.g. metallurgy).

The PHTL can operate at a minimum pressure of about 0.1 Bara and a maximum pressure of about 20 Bara although a much higher pressure can be possible but generally not needed to maintain the heat transfer fluid in a liquid phase. The maximum pressure of the PHTL can be substantially determined by the elevation difference between the HVHS (303) and the storage tank (301) or the heat transfer devices (for example coils 171-177) such that an acceptable margin between the operating pressure and the vapor pressure of the PHTF is maintained. The PHTL pressure can be about 1 to about 10 Bara if molten salts or liquid metals are used for the PHTF. The PHTL pressure may be substantially higher if fluids such as supercritical $CO_2$ are used as the PHTF.

The PHTL can also include further equipment, subsystems and devices including valves 305, 306 and 307 and supplemental heaters (304). These further equipment, subsystems and devices can be used to preheat the PHTF during periods when the plant can be idle or at low capacity. These can also be used to assist to startup of the PHTL or other portions of Systems 100 and/or 200 or substantially change the plant load or temperature of the PHTF.

Figure 3:
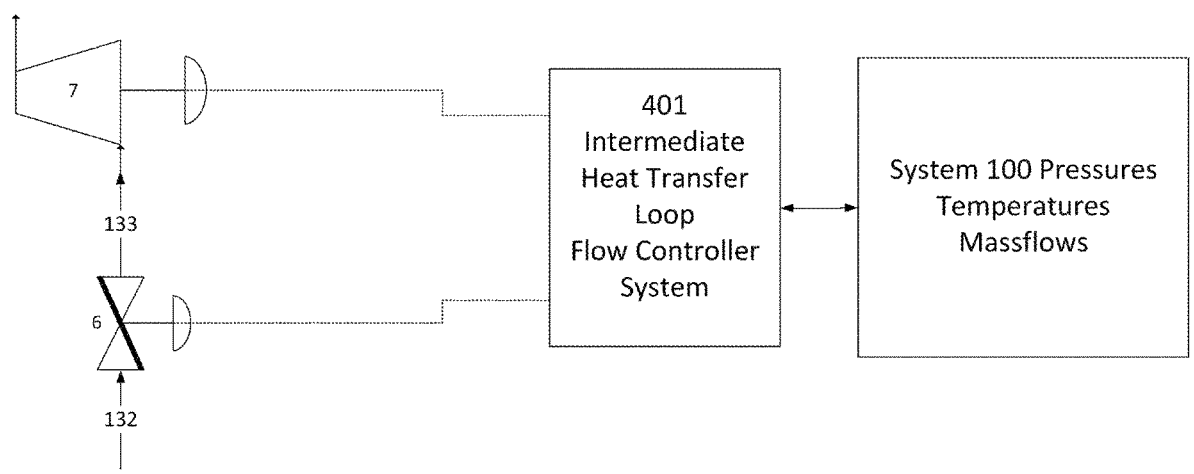
FIG. 3 depicts an illustrative control scheme for managing a circulation flow rate of the IHTF, according to one or more embodiments provided herein.

Sub System 1 can include one or more pumps (302). FIG. 3 illustrates a single pump (302) that can be used to circulate from the storage tank (301) to the HVHS (303) through a system of pathways, pipes, conduits and/or valves (305, 306, 307) to direct a first portion of the PHTF to 303 via pathway 322, direct a second portion of the PHTF to bypass 303 via pathway 330 under the control of valve 305. Valve 305 can be adjusted to control the temperature of the PHTF directed via pathway 324. If the temperature of the PHTF in pathway 324 is below the desired temperature, valve 305 can be modulated to direct more PHTF to 303 via pathway 322 and 323 and less PHTF via pathway 330. On the other hand, the temperature of the PHTF in pathway 324 is above the desired temperature, valve 305 can be alternatively modulated to direct less PHTF to 303 via pathway 322 and 323 and more PHTF via pathway 330. From pathway 324, the PHTF can be directed either to pathway 101 to the process plant exemplified by Systems 100 and/or 200 or via pathway 325 to be recirculated to tank 301 via valve 307 and pathway 326. The PHTF directed via pathway 101 can be returned via pathway 108 to valve 307 and returned to tank 301.

The PHTF can be directed to pathway 327 and valve 306 and pathway 326 to auxiliary heater 304 and then pathway 329 to return to tank 301 to heat the PHTF stored within tank 301. This means to heat the PHTF can be needed in times of low thermal production by 303, during a plant startup or shutdown procedure and/or to maintain a minimum acceptable temperature within the various pathways, tanks or equipment.

FIG. 2 is one example arrangement of Sub System 1. Many other arrangements can be provided to provide addition storage tanks, additional pumps and alternative control systems and methods. For example, while FIG. 2 illustrates a single pump service to both circulate PHTF from 301 to 303 and to the process plant, alternative arrangements could be used with a separate pump service to circulate the PHTF from the 301 to 303 and back to 301 and another pump service to circulate the PHTF from 301 to the process plant via pathway 101 and return it to 301 via pathway 108. Other arrangements could be used with separate hot and cold PHTF tanks such that the PHTF from a cold tank can be circulated to 303 with a first portion directed to a process plant and a second portion returned to the hot tank and a third portion circulated from the hot tank to the process plant and then returned to the cold tank.

Referring to FIGS. 1 and 5, the IHTL can include a recirculating IHTF such as atmospheric air, humidified air, water vapor, helium, argon, carbon dioxide, other constituents of air including xenon, neon, hydrogen and krypton, other liquids and gases or mixtures of the several gases or liquids. The IHTL can also include any one or more circulating fans (7), pumps (5) and/or compressors (7) and any one or more heat transfer devices (for example Coils 171 to 177) to transfer heat from the PHTF to the IHTF and then to at least the feed that can be circulated within the several Process Heater, Reactor or Separator systems (henceforth REACTOR) as shown in Systems 100 and 200. The IHTL can operate at a minimum pressure of about 0.1 Bara and a maximum pressure of about 10 Bara although a much higher pressure can be possible. The operating pressure can be close to, but somewhat greater, than the local atmospheric pressure. The operating pressure can be selected to minimize the pressure and/or vacuum rating of the structure enclosing the IHTL (for example Sub System 199). Increasing the pressure of the IHTL can improve the performance (i.e. heat transfer rate or reduce the size) of the various heat transfer devices (for example Coils 171 to 177) but can also increase at least the cost and complexity of the IHTL enclosure. A practical design can consider the potential size reduction of the IHTL enclosure (Sub System 199) and heat transfer devices (for example Coils 171 to 177) versus the pressure rating and structural complexity of that enclosure.

Further to again reduce the cost and complexity of the IHTL enclosure, it can include pressure relief and/or vacuum relief doors or panels. For example, dead weight safety valves, panels and doors are commonly installed on gas turbine air inlet plenums and exhaust plenums to prevent over and/or under pressure of these plenum enclosures. In a similar manner, similar devices can be installed within the IHTL to prevent under pressure and/or over pressure of the IHTL enclosure. For example, under pressure can be caused by a cooling of the average temperature of the IHTF within the enclosure. Over pressure can be caused by an opposite increase of the average temperature of the IHTF within the enclosure or even a leak of a REACTOR or PHTF into the IHTL enclosure that can be caused by a failure of one of the several heat transfer devices (e.g. a tube leak or rupture of one or more of the Coils 171 to 177).

To avoid unplanned activation of such a under or over pressure device, a control system can be provided to routinely adjust the mass or moles of IHTF within the IHTL. For example, a control system can be used to add or remove IHTF to maintain the pressure of the ITHL within 1%, 2%, 3%, 5%, 10% or 20% of a pressure setpoint that is within the previously stated range of IHTL pressures. Specifically, if the pressure within the Sub System 199 (IHTL) is below the desired pressure, additional IHTF can be added to the IHTL from an external source, reservoir or even from the atmosphere via a valve and/or a pump or compressor (not shown). Alternatively, if the pressure within the IHTL is above the desired pressure, then a portion of the IHTF can be removed and returned to the external source, reservoir or even vented to the atmosphere via a similar valve and/or pump or compressor (not shown).

Further, the operating pressure of the IHTL can be selected to reduce the pressure difference between the IHTL and the PHTL. The PHTL can be assumed to require the highest operating temperature of the PHTL, IHTL and REACTOR. As a result, the PHTL can require special high temperature alloys for the construction of its components that can be subjected to metallurgical conditions such as creep deformation and/or corrosion Minimizing the pressure difference between the pressures of the PHTL and the IHTL will reduce the stress of the PHTL components and allow either a less expensive metal alloy and/or the use of a lower pipe schedule (i.e. thinner wall in reference to the pipe or tube diameter or reduced plate thickness) for general piping and especially for the tubing, plates or similar components of heat transfer devices. Lowering the pipe schedule has the benefits to improve heat transfer coefficients within the heat transfer devices by reducing the heat conduction resistance of the piping or tubing or plates. Lowering the pipe schedule also reduces the material cost to construct the various components of the PHTL especially since in general, higher cost nickel, cobalt, molybdenum and chromium-based alloys can be required. The pressure of the IHTF can be somewhat above the local ambient pressure and below the minimum pressure of the PHTL at the various heat exchange devices that transfer heat from the PHTF to the IHTF. The lower pressure of the IHTF versus the PHTF can ensure that any leakage of the PHTF will be from the PHTL to the IHTL.

The PHTL can have a minimum pressure consistent with the elevation change from the highest portion of the PHTL that is in direct communication with the process plant to the location of these various heat exchange devices. As an example, if a molten salt with a specific gravity of 2.0 is used as the PHTF and the highest point of the PHTL can be 100 m higher than these heat exchange devices, then a maximum pressure difference of about 20 bar can be expected. For an application with a lesser elevation difference or one in which a storage tank is placed within the pathways between the HVHS (303) and the process plant, the maximum pressure difference can be 10 bar, or 5 bar or 2 bar. This can be contrasted to a pressure difference of several hundred bar or more if the PHTF is required to transfer heat directly to a REACTOR that is some embodiments may require pressures exceeding 50, 100, 200, 500 or even 1000 bara. Further, in such a process plant, shell-and-tube heat exchangers would most likely be required and very likely multiple heat exchangers in parallel for a large-scale process plant. These multiple parallel shell-and-tube heat exchangers can require complex piping arrangements to overcome the potential thermal growth and movement of the piping during modes of plant operation from shutdown to startup operation.

The IHTL can incorporate a structure and flow path for the IHTF like the flow path of the gas turbine exhaust/flue gas of a gas turbine combined cycle Heat Recovery Steam Generator (HRSG) with heat transfer coils for the various heat transfer devices (for example Coils 171-177) supported to allow free thermal growth plus additional ducting to recirculate the IHTF. A configuration similar to HRSG construction provides for easy scaling of the heat transfer coil for small to utility scale power plants without the limitations of commercially available shell and tube since the structure of the HRSG-like flow path of the IHTL can be scaled to accommodate a larger cross-sectional area (flow path area) required of larger heat transfer coils that can be required for the PHTF and REACTOR as the IHTL can operate at pressures near, but generally slightly above, the local ambient pressure.

For a horizontal arrangement (FIG. 1), a circulating fan or blower or compressor (7) can be provided to maintain circulation and a damper or similar system (6) can be provided to regulate the recirculation rate. Alternatively, the operating characteristics (guide vanes and/or rotating blade/vanes position or operating speed), of the blower (7) can be adjusted to regulate the recirculation rate. In this arrangement with a circulating fan or blower (7) and with or without a damper (6), if the recirculation rate of the IHTF is less than the desired flow rate, then the blower (7) operating speed can be increased, the inlet guide vanes of the blower can be moved to a more open position or angle, the rotating blades or stator vanes can be moved to a more open position or angle or the damper (6) can be moved to a more open position or angle. Alternatively, if the recirculation rate of the IHTF is more than the desired flow rate, then the blower (7) operating speed can be decreased, the inlet guide vanes of the blower can be moved to a less open position or angle, the rotating blades or stator vanes can be moved to a less open position or angle or the damper (6) can be moved to a less open position or angle.

For a vertical arrangement (FIG. 2), the various heat transfer devices (Coils 171 to 177) can be arranged to create hot and cold legs or sections of the IHTL to facilitate a natural circulation from the differing buoyancies of the hot vs. cold IHTF within the IHTL. A blower (7) can be optionally used like FIG. 1 and/or a damper system (6) can be used to regulate the recirculation rate.

This natural circulation results from the differing densities of the hot vs. cold legs of the IHTL. The differential pressure driving such circulation can be estimated using the Archimedes Principle when applied to columns of fluids of different densities. The differential pressure that drives the circulation an be approximately equal to the average height of the hot and cold legs multiplied by the density difference of the hot and cold legs multiplied by the local gravity constant (e.g. 9.8 m/s/s). For example, dry air at near ambient pressure with a temperature difference of 400° C. and a hot and cold leg heights of 100 m can create a differential pressure of about 0.5 kPa or about 50 mm WG. In some embodiments, a combination of natural circulation and forced circulation can be employed to reduce the differential pressure needed from the blower (7) and therefore reduce the power required to drive this recirculation blower (7).

Sample Embodiments

Although doing reactions at lower temperatures reduces the rate of the reaction or the conversion rate, by operating these reactions at lower temperatures, unwanted reactions that may result in unwanted by-products can be reduced and/or avoided. Further, the multiple stages of the conversion process design described in this patent may equal or exceed the total product or conversion rate that could be obtained by conducting the reaction at higher temperatures.

Each stage of the conversion process may comprise steps such as: heating feeds to an endothermic conversion, removing heat from a exothermic conversion, providing heating and/or cooling to various parts of a thermal swing and/or pressure swing separator and/or other heating or cooling functions, such as steam generation. For each step, heat transfer to or from the IHTF may be used in addition to heating the IHTF via a portion of the PHTF to provide a surprising and unexpected improvement of thermal efficiency.

Separation of the product from the unconverted material is a critical criterion for this multiple reaction in series process. This is because if the product were not removed than the backward reaction would reduce the amount of material that can be reacted in the next reaction step. Any of the commercial separation technologies available (Pressure Swing Absorption (PSA), Temperature Swing Absorption (TSA), or membranes can be used to do the separation necessary. A combination of these separation technologies could also be utilized. New separation technologies using electricity and or magnetic fields or other novel separation technologies could also be utilized for the separation needed in this new process design when they become commercial.

Similarly, this new process design can be utilized with a wide range of reactions, including but not limited to: paralysis, thermal cracking, electro-chemistry, catalytic reactions and a wide range of reactions currently being developed for low temperature operation to provide higher energy efficiency and lower GHG emissions. One of these that have drawn attention lately is temperature-assisted electrolysis. The key to this new process design is not the reaction that is being utilized but the ability to do several (more than one) reaction steps in series.

In the discussion on how this process design could be utilized to produce hydrogen, the use of a dual shift catalysis and $CO_2$ absorbent was described. The advantage of using this type of dual catalysis/absorbent is twofold. First, it lowers the CAPEX required is the two steps can be done in a single vessel instead of requiring a vessel for each step. Second, by absorbing the $CO_2$ the equilibrium point is more toward lower CO in the effluent. Using the more traditional design of a separate shift and separation vessel is also possible with this new process design.

In the traditional design the exothermic heat of reaction is normally used to produce steam. In the traditional Steam Methane Reformer (SMR) excess steam (more than the process requires) is produced and has to be exported or condensed. In our new process design the heat from the exothermic shift reaction can be used to heat the IHTF and no excess steam is produced (steam production is controlled to meet the process steam requirements). The shift reaction is very sensitive the inlet temperature and is also very non-linear. To obtain only 1% CO in the effluent, the inlet temperature needs to be 220 degrees C. To obtain 5% CO in the effluent, the inlet temperature needs only to be cooled to 440 degrees C. To improve thermal efficiency and reduce CAPEX, the new process design will only cool the shift feed to about 440° C. in the first few conversion trains and will cool the feed to the shift in the final reaction train to 220° C.

Since the new process design has a recycle stream back to the first reaction train, impurities in the natural gas (NG) need to be removed so they do not cycle up in the system. Nitrogen is normally the largest impurity in NG (normally 4 to 5 mole percent). The new process design will include a separation step in the recycle stream to capture the nitrogen and vent it to the atmosphere.

Currently, almost all geothermal plants use the heat to produce power. Geothermal heat is normally up to about 300° C. This new process design will allow geothermal heat to produce high value produces and make more geothermal projects economically feasible.

Some reactions require very accurate temperature control, the XYZ heat transfer technology can provide the accuracy that is needed for any reaction. This is accomplished by adding additional heating coils in the IHTF fluid and additional process heating coils in the IHTF. By adding these additional coils, the temperature of the IHTF can be controlled to the temperature range required to keep the process fluid at the required temperature.

The use of heat integration from the process stream to the IHTF can increase the thermal efficiency of the process. When the process stream needs to be cooled that heat can be used to heat or reheat the IHTF. Similarly, if the process contains an exothermic reaction, that heat can be used to heat or reheat the IHTF. Both of these types of heat integration increase the thermal efficiency of the process and decrease the amount of solar heat (for example) that is required.

In processes where accurate temperature control is required, the use of multiple heating coils and process coils in series can provide the accurate temperature control that is need for any process. A control system would use the input from an analyzer for the composition of the feed going to the reaction and the temperature of the feed to calculate the endothermic heat required and also calculate the flow rate set point on the feed to the reactor. Three temperature sensors with two out of three voting would provide an accurate temperature of the effluent from the reactor. That temperature would then be utilized to reset the flow controller set point to maintain the temperature accuracy required by the process.

The IHTF can be recirculated and in sequence can be heated by absorbing heat from the PHTF and then cooled by releasing heat to a REACTOR at a plurality of points within the thermal conversion process. The temperature of the IHTF can be about A° C., where A° C. is about 20° C., 40° C., 60° C., 80° C., 100° C., 200° C. or up to a reasonable operating limit of a fan or blower or compressor before the IHTF enters the at least one recirculating fan, blower or compressor (7). Even higher temperatures are acceptable, but it is recognized by those skilled in the art that the power required to increase the pressure of the IHTF via such a recirculating fan, blower or compressor is proportional to the absolute temperature of the IHTF entering this fan, blower or compressor and so a lower temperature can be used unless another potential benefit outweighs this increased power requirement.

In some embodiments, the IHTF can undergo a phase change or partial phase change (e.g. if the IHTF is water vapor, or a humidified gas) after cooling to temperature A. Optionally, a separator (4) and condensate pump (5) can be used to pump the condensed portion of the IHTF in parallel with (7) and mix the vapor and liquid portions prior to entering Sub System 199 or alternatively to inject or spray the liquid portion after the vapor portion enters the first heat exchange device within Sub System 199 to ensure that the liquid portion is fully vaporized and can even enhances the heat transfer rate by vaporization of the liquid portion within the first heat exchange device.

The IHTF can then be heated to an intermediate temperature B° C., where B° C. can be about 80° C. to about 400° C. or about 500° C., by exchanging heat with a REACTOR (for example with Coil 171 of FIGS. 1 and 2). The IHTF can then be further heated to a temperature C° C., where C° C. is about 400° C., 500° C., 600° C., 700° C. or up to about 800° C. or more, by exchanging heat with a portion of the PHTF (for example with Coil 172 of FIGS. 1 and 2).

A REACTOR can be further heated by exchanging heat with the IHTF by, for example, heating the IHTF with a portion of the PHTF and then transferring such heat from the IHTF to the REACTOR (for example, using at least two of Coils 171 to 177) until a REACTOR reaches the temperature X° C. The number of steps in this sequence can be determined by considering the flow rate of the fluids in each REACTOR, the flow rate of the IHTF, the various temperatures including the supply temperature of the PHTF, the minimum operating temperature of the PHTF, the heat exchanger approach temperature between the intermediate and PHTF, or any combination of two or more of the foregoing. The heat transfer surface area (effective area) at each step can be selected based upon the available temperature differences and combined heat transfer coefficients for the various fluids.

In certain embodiments, the temperature B° C. can be selected to be the same, similar, or greater than the minimum acceptable operating temperature of the PHTF. This minimum temperature can be determined by the melting point of a molten salt, pour point of a heat transfer oil or in some other way related to the flow-ability of the PHTF. In some cases, it can be advantageous to use a second PHTF that has a lower melting temperature than the first for those heat transfer devices that can have a minimum operating temperature of the IHTF that is less than the melting temperature of the first PHTF. For these cases, the second PHTF can be heated circulated in a fourth loop and either be heated directly by the high value heat source or by the first PHTF via at least one heat exchange device.

Now referring to FIG. 3, to control the heat transfer effectiveness of various heat transfer devices, the flow rate of the IHTF can be adjusted by use of control surfaces, adjustable speed fans, blowers or compressors or other means (See FIG. 3 and items 6 and/or 7). Various measurements, for example temperatures or temperature differences, within the IHTL can be used to adjust this flow rate to reach a desired set point. The IHTF flow rate can be adjusted such that the "hot-side" difference between the IHTF inlet temperature minus the REACTOR outlet temperature can be equal to the "cold-side" difference between the IHTF exit temperature minus the REACTOR entrance temperature of the same heater plus or minus a fixed or variable temperature margin setpoint. The cold-side approach temperature can be equal to or similar to the hot-side approach temperature of the target heat exchange device plus or minus a fixed or variable margin or setpoint. If variable, this temperature margin setpoint can be determined or estimated based upon, at least in part, by the IHTF flow rate, a REACTOR flow rate and/or a PHTF flow rate.

It should be apparent that there are many potential methods to measure or determine the hot-side and cold-side temperature differences and all can have equal effectiveness to use as a basis to adjust the IHTF flow rate. For example, the temperatures of the IHTF can be measured or determined at first and second locations proximate to the inlet and outlet IHTF streams to the heat transfer device and similarly the temperatures of the REACTOR can be measured and determined at first and second locations proximate to the REACTOR outlet and inlet to the heat transfer device, then the hot-side difference can be calculated from the temperature difference between the first IHTF and REACTOR locations and the cold-side difference calculated from the temperature difference between the second IHTF and REACTOR locations. If the difference between this hot-side difference and the cold-side difference is zero, then they are balanced. An equivalent result can be found by calculating the sum of the temperatures at the first IHTF location and the second REACTOR location less the sum of the temperatures at the second IHTF location and the first REACTOR location. If this result is zero, then the hot-side and cold-side pinches are balanced. Another method cannot require the measurement of distinct temperatures but rather to measure these temperature differences directly. For example, a thermocouple measures the difference between the temperature at a desired measurement location and a reference location. If this reference location is selected to be another stream location, then the temperature differences can be measured directly. Similarly, thermistors can be used in a similar fashion to directly measure the temperature differences. In addition, by using one or more Wheatstone Bridges or similar devices known to those skilled in the art, a direct measurement or determination of the difference among the two pairs of temperature locations can be made. For the purposes of this disclosure, each of these means or methods to ascertain or quantify the degree to which the hot-side difference is similar to the cold-side difference are equal with respect to the adjustment of the IHTF flow rate.

This method can be used to balance and so avoid a hot-side or cold-side pinch of one or several heat transfer devices. One or more of the heaters can be selected as the base for these temperature differences and they can be used individually, selected based on high-low results, various averaging or optimization methods to provide input to the adjustment of the IHTF flow rate.

Figure 4:
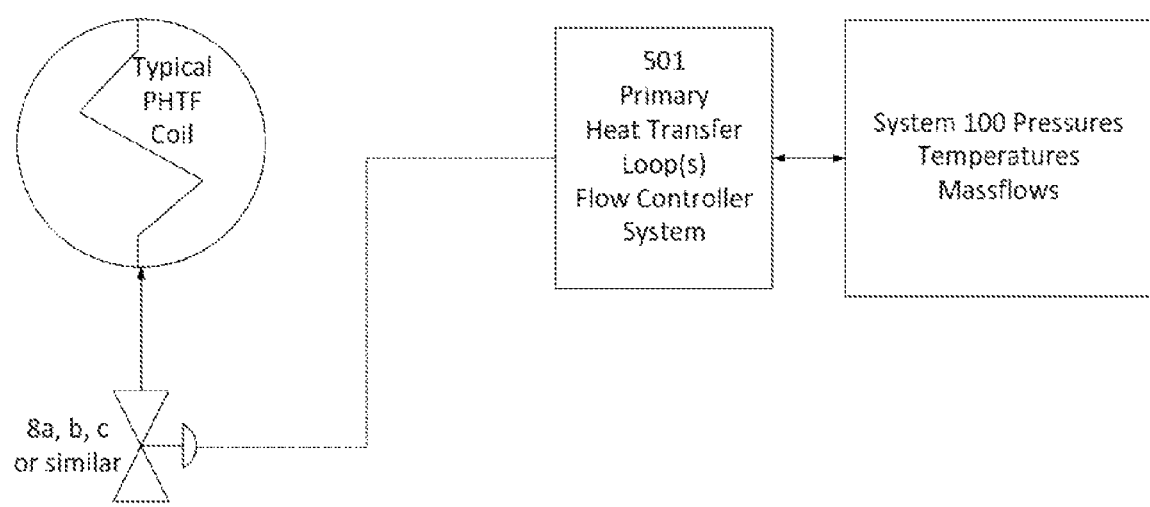
FIG. 4 depicts an illustrative control scheme for managing a flow rate of each portion of the PHTF, according to one or more embodiments provided herein.

FIG. 4 depicts an illustrative control scheme for managing a flow rate of each portion of the PHTF, according to one or more embodiments. The flow rate of each portion of the PHTF to each IHTF heater can be selected and/or controlled to ensure that the temperature of the PHTF exiting each of these heaters is above the minimum operating temperature of the PHTF. This limit control can be in addition to active flow control of the portion of the PHTF to each IHTF heater. Since each of these heaters will generally reach a pinch point at the hot side of the heater, PHTF flow rate to a particular heater can be effectively used to control the outlet temperature of the IHTF from the heater.

FIG. 5 depicts a schematic representation of an illustrative System 200 for thermally converting a feed to produce at least a thermally converted product stream, according to one or more embodiments provided herein. System 200 can include a high-value heat source depicted as Sub System 1, a system to circulate a PHTF from Sub System 1 to a process plant, one or more heat exchange devices (three are shown 172, 174, 176, and 167) to transfer heat from the PHTF via streams 101, 102, 103 and 104 to a circulating IHTF and return the PHTF to Sub System 1 via streams 105, 106, 107 and 108, one or more heat exchange devices (four are shown 171, 173, 175, and 177) to transfer heat to or from the circulating IHTF to the substantially not recirculated feed at several points within the thermal conversion process plant, to generate useful products and byproducts possibly to recycle a portion of any unreacted feed to another stage of the thermal conversion process plant. System 200 depicts a closed intermediate heat transfer loop wherein the intermediate heat transfer loop is substantially recirculated. Unlike System 100, the equipment of System 200 is arranged to form hot and cold legs or sections with a vertical orientation within the intermediate heat transfer loop such that the circulation of the IHTF is substantially caused by the buoyancy difference between the said hot and cold legs of the loop.

We claim:

1. The method for providing process heat to thermally convert hydrocarbon fluids, chemicals and other substances to a useful product and/or byproduct by:
   a. heating a primary heat transfer fluid (PHTF) using an external heat source to provide a heated primary heat transfer fluid
   b. circulating an intermediate heat transfer fluid (IHTF) through a housing and about at least four discreet heat transfer devices
   c. circulating a first portion of the heated primary heat transfer fluid through a first of the at least four discreet heat transfer devices
   d. circulating a second portion of the heated primary heat transfer fluid through a second of the four or more discreet heat transfer devices within the housing,
   e. indirectly heating the intermediate heat transfer fluid by the heated primary heat transfer fluid from both the first and second discreet heat transfer devices;
   f. circulating at least a portion of a feed stream through a third of the four or more discreet heat transfer devices within the housing
   g. causing a thermal conversion of at least a part of the feed to produce a product, byproduct and possibly a portion of unreacted feed
   h. circulating a fluid comprising one or more of a second portion of a feed, a part of the product, a part of the byproduct, or a part of the unreacted feed through a fourth of the four or more discreet heat transfer devices within the housing and causing at least one of an additional thermal conversion, separation of the said fluid to form a product or byproduct rich stream and a product or byproduct lean stream and heating or cooling of the fluid.

2. The method of claim 1 in which the feed stream is a combination of a hydrocarbon fluid, chemical or other substances and unreacted feed.

3. The method of claim 1 in which the thermal conversion and/or separation is endothermic thereby cooling the intermediate heat transfer fluid.

4. The method of claim 1 in which the thermal conversion and/or separation is exothermic thereby heating the intermediate heat transfer fluid.

5. The method of claim 1 in which the thermal conversion is enhanced by using a commercial catalyst.

6. The method of claim 1 in which one the conversion catalyst also acts as an adsorption media for one of the coproducts of the reaction.

7. The method of claim 1 in which the external heating source is at least one of concentrated solar receiver, concentrated solar collector, nuclear reactor, geothermal heat collector, combustion of hydrogen or other non-greenhouse gas emitting fuel and hydrocarbon fuels.

8. The method of claim 1 in which the flow rate of the primary heat transfer fluid is adjusted to control the outlet temperature of the intermediate heat transfer fluid from a heat transfer device.

9. The method of claim 8 in which the flow rate of the primary heat transfer fluid is controlled to ensure that the temperature of the primary heat transfer fluid is above a minimum operating temperature of the PHTF.

10. The method of claim 8 in which the flow rate of the primary heat transfer fluid is controlled based on the temperatures, pressures and mass flow rates of at least one of the feed streams, reactor product stream, reactor byproduct stream, unreacted product stream and intermediate heat transfer fluid streams.

11. The method of claim 1 in which the flow rate of the intermediate heat transfer fluid is controlled based on the temperatures, pressures and mass flow rates of at least one of the feed streams, reactor product stream, reactor byproduct stream, unreacted product stream and intermediate heat transfer fluid streams.

12. The method of claim 10 in which an analyzer is used to control the flow rate and/or temperature of the feed.

13. The method of claim 2 in which the other substance is steam.

\* \* \* \* \*